(12) United States Patent
Salamat

(10) Patent No.: US 7,987,665 B2
(45) Date of Patent: Aug. 2, 2011

(54) EXHAUST EVACUATION APPARATUS

(76) Inventor: Jafar Salamat, Edmond, OK (US)

( * ) Notice: Subject to any disclaimer, the term of this patent is extended or adjusted under 35 U.S.C. 154(b) by 438 days.

(21) Appl. No.: 12/206,429

(22) Filed: Sep. 8, 2008

(65) Prior Publication Data

US 2010/0058749 A1    Mar. 11, 2010

(51) Int. Cl.
*F02B 35/00* (2006.01)
(52) U.S. Cl. ............................................. 60/315; 60/902
(58) Field of Classification Search .................. 60/39.34, 60/39.43, 280, 315, 316, 324, 902
See application file for complete search history.

(56) References Cited

U.S. PATENT DOCUMENTS

| | | | | |
|---|---|---|---|---|
| 3,107,484 A | * | 10/1963 | Touhey | 60/280 |
| 5,282,361 A | * | 2/1994 | Sung | 60/315 |
| 5,896,744 A | * | 4/1999 | Lee | 60/315 |

* cited by examiner

*Primary Examiner* — Thomas E Denion
*Assistant Examiner* — Audrey Klasterka
(74) *Attorney, Agent, or Firm* — Dunlap Codding, P.C.

(57) ABSTRACT

An apparatus for evacuating exhaust from an exhaust pipe of a vehicle having an external turbine and an internal turbine connected to the external turbine such that when the external turbine rotates the internal turbine rotates.

14 Claims, 5 Drawing Sheets and the external turbine 14 is adapted to be positioned on the exterior side of the exhaust pipe 12. The internal turbine 18 is connected to the external turbine 14 such that when the external turbine 14 rotates the internal turbine rotates 18. The support member 22 is adapted to connect the external turbine 14 and the internal turbine 18 to the exhaust pipe 12 such that when the vehicle is in forward motion, air flow over the external turbine 14 causes the external turbine 14 to rotate and thereby cause the internal turbine 18 to rotate to cause exhaust of the vehicle to be drawn or extracted from the exhaust pipe 12.

EXHAUST EVACUATION APPARATUS

BACKGROUND OF THE INVENTION

1. Field of the Invention

The present invention relates generally to an exhaust apparatus, and more particularly, but not by way of limitation, to an exhaust evacuation apparatus that utilizes the motion of a vehicle to improve the evacuation of exhaust from the vehicle.

2. Brief Description of Related Art

Internal combustion engines produce exhaust gases as a byproduct of the combustion process. In general, exhaust gases are expelled through an exhaust manifold which is designed to collect exhaust gases from one or more cylinders. The exhaust manifold is connected to an exhaust pipe which communicates exhaust gases into the open air. Internal combustion engines suffer from common drawbacks associated with the use of exhaust systems. In particular, exhaust gases which moving through bends and past obstructions within exhaust pipes, mufflers, and/or catalytic converters serve to reduce the performance (i.e., lower peak engine power, lower gas mileage) of the engine by creating back pressures. Therefore, reducing back pressures within the exhaust system cause the engine to operate more efficiently.

Previous attempts to reduce back pressure within exhaust systems include removing or modifying the exhaust muffler and providing internal turbines. However, such attempts are replete with drawbacks. For example, removing the exhaust muffler eliminates one source of the back pressure, but also results in non-desirous engine noise. The positioning of a turbine within the exhaust pipe is intended to draw the exhaust gases from the exhaust pipe to reduce back pressure. The turbine may be powered by the motion of the exhaust gases or be powered by a power source, such as an electric motor. Internal turbines powered by exhaust gases alone produce little effect. The efficiency of an internal turbine may be increased if the internal turbine is powered by an electric motor, although any improvement in efficiency is met with a proportional reduction in efficiency caused by increasing demand on the engine which must produce additional electricity to run the electric motor. Furthermore, electric motors operating within an exhaust pipe are subjected to high temperatures from exhaust gases passing through the exhaust pipe. Electric motors operating in high temperature environments suffer from increased wear and tear and therefore require more frequent maintenance.

Therefore, a need exists for an exhaust evacuation apparatus that reduces the back pressure of an exhaust system, and improves the efficiency and performance of an associated internal combustion engine. It is to such an exhaust evacuation apparatus that the present invention is directed.

DETAILED DESCRIPTION OF THE INVENTION

Figure 1:
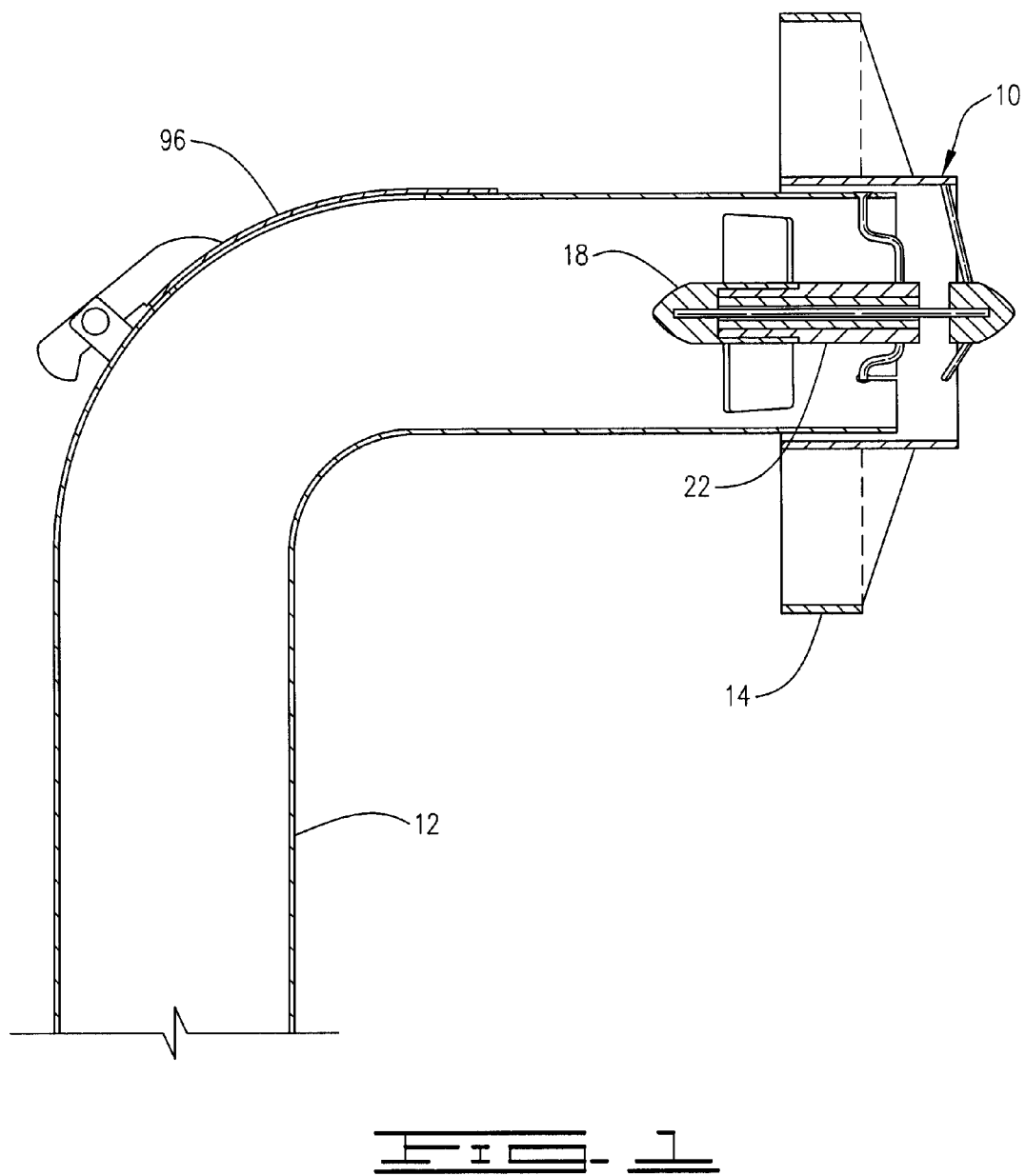
FIG. 1 is a cross sectional view of an exhaust evacuation apparatus constructed in accordance with the present invention shown in association with an exhaust pipe.
Figure 2:
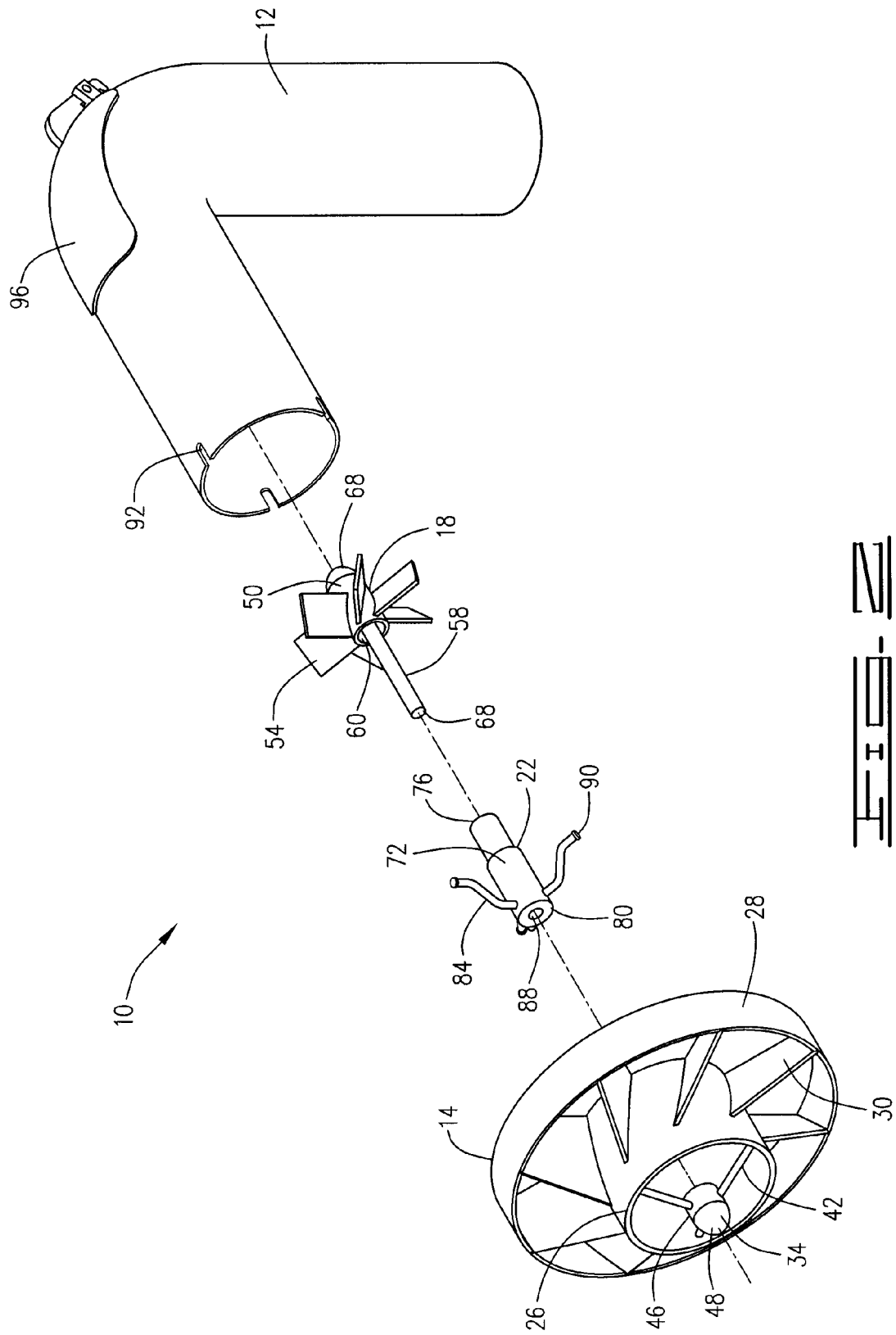
FIG. 2 is an exploded perspective view of the exhaust evacuation apparatus of FIG. 1.

Referring now to the drawings, and more particularly to FIGS. 1 and 2, collectively shown therein is an exhaust evacuation apparatus 10 for evacuating exhaust from an exhaust pipe 12 of a vehicle (not shown). The exhaust evacuation apparatus 10 generally includes an external turbine 14, an internal turbine 18, and a support member 22. The internal turbine 18 is adapted to be positioned in the exhaust pipe 12, As best shown in FIG. 2, the external turbine 14 has a base 26, a plurality of blades 30, and a connecting member 34. The base 26 of the external turbine 14 is fabricated from a rigid material, such as metal, plastic, a resin, or the like. The base 26 is shown as having substantially tubular geometry, although the base 26 may have any number of differing geometries that would be known to one of ordinary skill in the art having the present disclosure before them. The base 26 is dimensioned to rotate freely around at least a portion of the exterior side of the associated exhaust pipe 12.

The blades 30 extend from the base 26 and are spaced at substantially equal angular increments about the base 26. The number, angle, pitch, spacing, and geometry of the blades 30 may vary according to design requirements. The external turbine 14 may optionally include an outer ring 28. The outer ring 28 is connected to the outer ends of the blades 30 to provide a protective covering and to reduce physical damage to the blades 30.

The connecting member 34 functions to rotatably connect the external turbine 14 and the internal turbine 18. In one embodiment, the connecting member 34 includes radial spokes 42 and a hub 46. The radial spokes 42 are attached to at least a portion of the base 26, and are also connected to the hub 46 so that the hub 46 is in a coaxial relationship with the base 26. It will be understood that the radial spokes 42 and the hub 46 may be fabricated as an integral member along with the base 26. Also, to improve the aerodynamic properties of the hub 46, the hub 46 may include a conical tip 48.

The internal turbine 18 is shown as having a hub 50, a plurality of blades 54, and a shaft 58. The internal turbine 18 may be formed of any suitable rigid material, such as metal, plastic, a resin, or the like. The hub 50 is shown as having a recess 60 and a substantially cylindrical geometry, although the hub 50 may have any number of differing geometries that would be known to one of ordinary skill in the art having the present disclosure before them. Also, as with the hub 46 of the connecting member 34, the hub 50 may have a conical portion 68 to increase the aerodynamic properties of the hub 50. The hub 50 is preferably constructed to have a minimum diameter so as not to impede the flow of exhaust gases through the exhaust pipe 12.

The blades 54 extend radially from the hub 50 and are preferably spaced at substantially equal angular increments about the hub 50. The number, angle, pitch, spacing and geometry of the blades 54 may be varied according to design requirements. It will be understood that although the blades 54 have been disclosed as extending radially from the hub 50, they may likewise extend radially from the shaft 58.

The shaft 58 is centrally connected to the hub 50 and extends through the recess 60 away from the hub 50 a distance such that a distal end 68 of the shaft 58 is connect able to the hub 46 of the external turbine 14 so that the external turbine 14 is positionable on the exterior side of the exhaust pipe 12 while the internal turbine 16 is positionable within the exhaust pipe 12.

To attach at least one of the external turbine 14 and the internal turbine 18 with at least a portion of the exhaust pipe 12, the support member 22 is utilized. The support member 22 generally includes a carrier body 72 having a first end 76, a second end 80, and a plurality of brace members 84, extending from the carrier body 72. The carrier body 72 has a central axial bore 88 formed therethrough for rotatably receiving the shaft 58 of the internal turbine 18. In one embodiment, the first end 76 of the carrier body 72 has a diameter less than the diameter of the second end 80, and the first end 76 is sized to be rotatably received in the recess 60 of the hub 50 of the internal turbine 18. It will be understood that the first end 76 of the carrier body 72 may have a diameter equal to, or greater than the diameter of the second end 80, and in this configuration, the first end 76 rotatably abuts the hub 50 of the internal turbine 18. It will be further understood that the length of the carrier body 72 should be sufficient to permit the distal end 68 of the shaft 58 to extend past the second end 80 of the carrier body 72 so as to be connectable to the hub 46 of the external turbine 14.

The brace members 84 extend from the carrier body 72 of the support member 22 and are adapted to connect to at least a portion of the exhaust pipe 12. In one embodiment, the distal ends of the brace members 84 are provided with flanged ends 90, and the exhaust pipe 12 is provided with a plurality of notches 92 for receiving the flanged ends 90 of the brace members 84. The brace members 84 are shown to have a generally cylindrical shape. To increase efficiency and aerodynamic performance however, the brace members 84 may be formed of varying shapes, such as an air foil.

Figure 3:
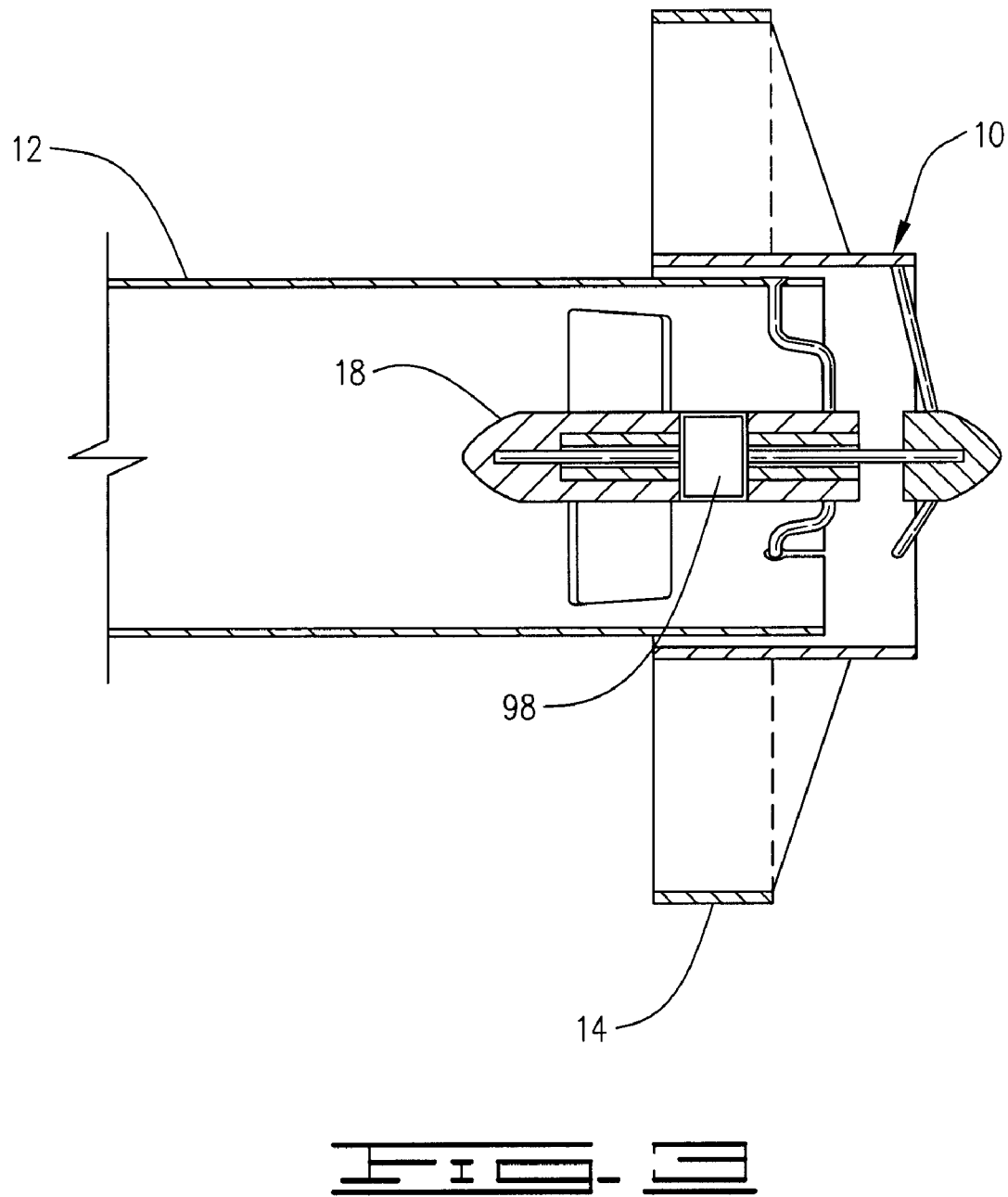
FIG. 3 is a schematic view of an exhaust evacuation apparatus constructed in accordance with the present invention.

As illustrated in FIG. 3, in some applications it may be advantageous to regulate the speed at which the internal turbine 18 turns. Therefore, the exhaust evacuation apparatus 10 may optionally include a transmission assembly 98. The transmission assembly 98 provides a mechanical linkage between the external turbine 14 and the internal turbine 18. More particularly, the transmission assembly 98 provides speed-torque conversion, converting the high torque, low RPM generated by the external turbine 14 to a higher RPM for the internal turbine 18, or vice versa. The transmission assembly 98 may comprise, for example, a plurality of gears having specific gear ratios. The gear ratios of the plurality of gears may be varied according to design requirements.

In use, the exhaust evacuation apparatus 10 is secured to the exhaust pipe 12 of a vehicle (not shown). More preferably, the exhaust evacuation apparatus 10 is secured to the exhaust pipe 12 of a vehicle having an exhaust pipe 12 with a 90° bend so that the external turbine 14 is positioned substantially parallel to the travel path of the vehicle. Once the exhaust evacuation apparatus 10 is secured to the exhaust pipe 12 with the external turbine 14 positioned on the exterior side of the exhaust pipe 12 and the internal turbine 18 positioned in the exhaust pipe 12, forward motion of the vehicle causes air to flow over the blades 30 of the external turbine 14. In situations where the vehicle is not moving, the exhaust pipe 12 may include an idle door 96 which allows exhaust gases to vent directly up through the exhaust pipe 12. The flow of air over the blades 30 causes the external turbine 14 to rotate. The rotation of the external turbine 14, in turn, causes the internal turbine 18 to rotate. Rotation of the internal turbine 18 causes exhaust gases to more effectively pass from inside the exhaust pipe 12. The extraction of exhaust gases reduces back pressure and provides enhanced performance and efficiency and increases the gas mileage of an internal combustion engine.

Figure 4:
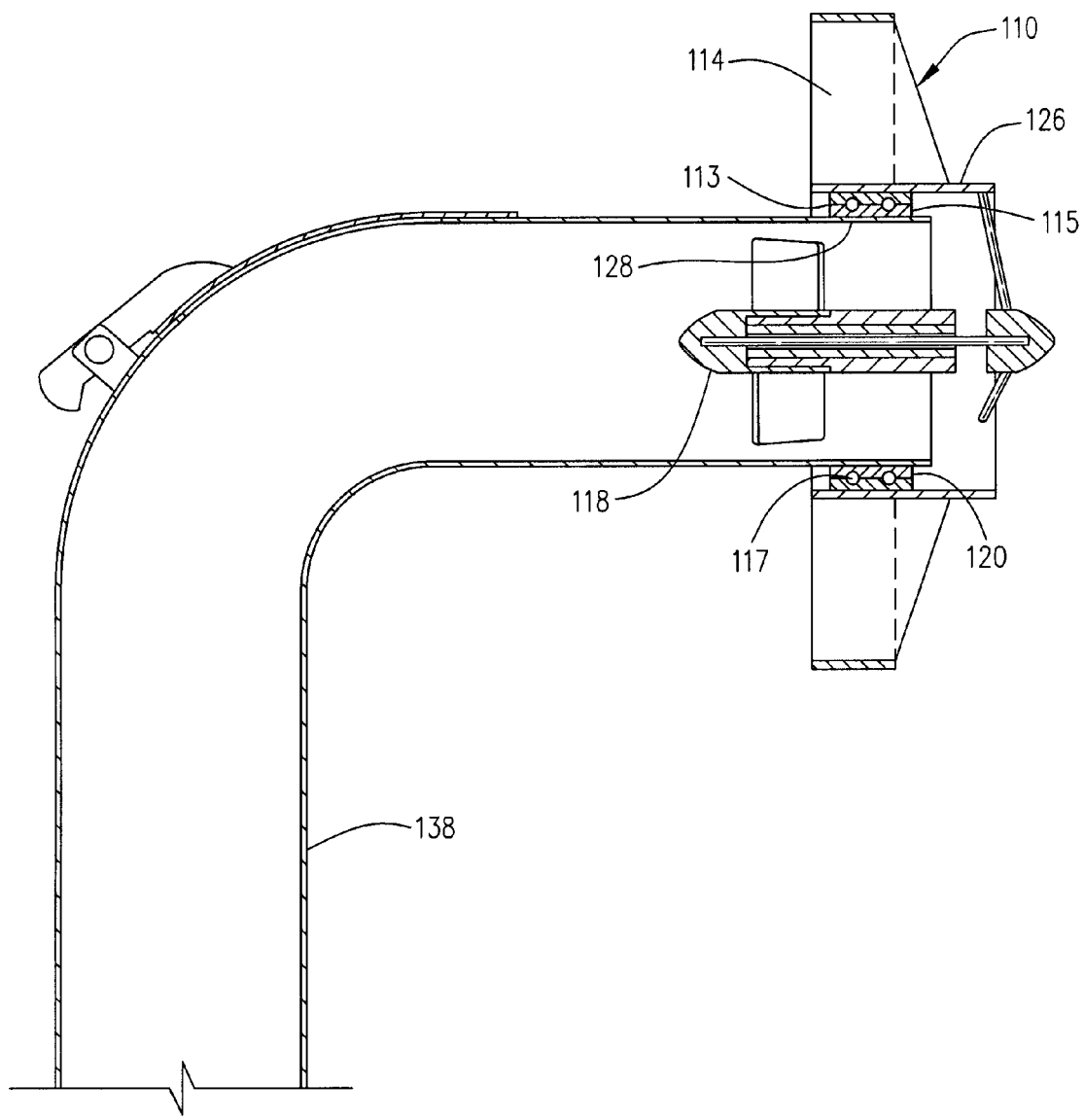
FIGS. 4-5 are cross-sectional views of alternative embodiments of an exhaust evacuation apparatus.

Referring now to FIG. 4, another embodiment of an exhaust evacuation apparatus 110 is shown. The exhaust apparatus 110 includes an external turbine 114 and an internal turbine 118. Both the external turbine 114 and the internal turbine 118 are constructed similarly to the previous embodiment discussed above. The exhaust evacuation apparatus 110 further includes a rolling bearing element 120. The rolling bearing element 120 includes a first race 113 connected to a base 126 of the external turbine 114 and a second race 115 connected to an exterior side 128 of exhaust pipe 138. The roller bearing element 120 further includes a plurality of bearing elements 117 positioned between the first race 113 and the second race 115 to facilitate rotation of the first race 113 around the second race 115. Rotation of the first race 113 around the second race 115 in turn, facilitates rotation of both the external turbine 114 and the internal turbine 118.

Figure 5:
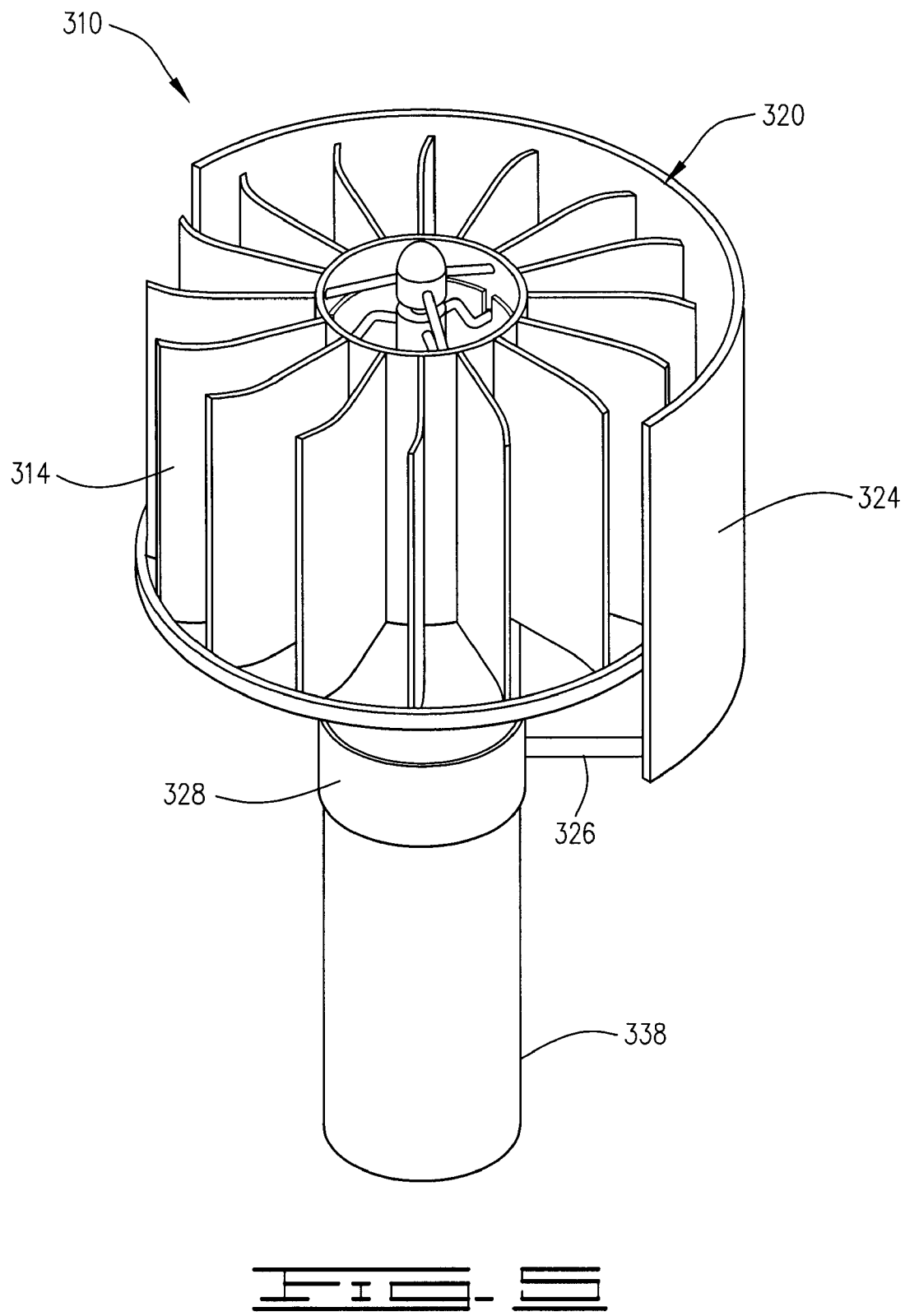

Referring now to FIG. 5, another embodiment of an exhaust evacuation apparatus 310 is shown. In this embodiment, the exhaust evacuation apparatus 310 is connectable to a substantially vertical exhaust pipe 338. The exhaust evacuation apparatus 310 include an external turbine 314 and internal turbine (not shown) which is similar in construction to the internal turbine 18 described above.

The blades 354 extend radially from the hub 350 of the external turbine 314 and are preferably spaced at substantially equal angular increments about the hub 350. The number, angle, pitch, spacing and geometry of the blades 354 may be varied according to design requirements. The blades 354 may have a substantially vertical orientation and may extend axially along the length of the exhaust pipe 338. Increasing the length of the blades 354 operates to increase the torque generated by the external turbine 314. The blades 354 may optionally include a ring or plurality of rings configured to maintain the stability, orientation and strength of the blades 354. The rings 360 may be disposed on the outside surface (similar to the outer ring 28 of FIG. 1), inside surface or the terminal ends of the blades 354.

The exhaust evacuation apparatus 310 also includes a wind shield 320. The wind shield 320 is constructed to cover at least a portion of the external turbine 314 and operates to selectively permit air to flow over only the exposed portion of the external turbine 314 as the vehicle is in forward motion. The wind shield 310 includes a shield member 324, a support member 326, and an exhaust pipe connector 328. The shield member 324 is constructed having a semi-circular geometrical configuration, although any one of a number of different geometrical configurations that would be known to one of ordinary skill in the art having the present disclosure before them are likewise contemplated in accordance with the present invention. The shield member 324 operates to shield the blades of the external turbine 314 rotating in the forward direction when the vehicle is in forward motion.

The support member 326 is constructed so as to connect the shield member 324 with the exhaust pipe connector 328. In this embodiment, the support member 326 includes a generally tubular member extending from the shield member 324 to the exhaust pipe connector 328. The exhaust pipe connector 328 may be constructed as a tubular member configured to fit over the exhaust pipe 338 and frictionally engage at least a portion of the exhaust pipe 338. In one embodiment, the exhaust pipe connector 328 may also include, for example, a clamp member fabricated so as to fit around the end of the exhaust pipe 338.

In use, the exhaust evacuation apparatus 310 is secured to the exhaust pipe 338 of a vehicle (not shown). More preferably, the exhaust evacuation apparatus 310 is secured to the exhaust pipe 338 of a vehicle having substantially vertical exhaust pipe so that the external turbine 314 is positioned substantially perpendicular to the travel path of the vehicle. The wind shield 320 is connected to the exhaust pipe 338 of the vehicle via the exhaust pipe connector 328. The exhaust evacuation apparatus 310 is secured to the exhaust pipe 338 with the external turbine 314 positioned on the exterior side of the exhaust pipe 338 and the internal turbine 318 positioned in the exhaust pipe 338. The shield member 324 may be adjusted to cover at least a portion of the external turbine 314. More specifically, the shield member 324 shields the blades of the external turbine 314 which rotate in the forward direction when the vehicle is in forward motion. Forward motion of the vehicle causes air to flow over the blades 330 of the external turbine 314 that are not covered by the shield member 324. The flow of air over the blades 330 causes the external turbine 314 to rotate. The rotation of the external turbine 314, in turn, causes the internal turbine 318 to rotate. Rotation of the internal turbine 318 causes exhaust gases to more effectively pass from inside the exhaust pipe 338. The extraction of exhaust gases reduces back pressure and provides enhanced performance and efficiency and increases the gas mileage of an internal combustion engine.

From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. An apparatus for evacuating exhaust from an exhaust pipe of a vehicle, comprising:
    an external turbine having a tubular base with a plurality of blades extending outwardly therefrom, the base being rotatable about the exhaust pipe, the external turbine further having a hub connected to the base so that the hub is in a co-axial relationship with the base;
    an internal turbine connected to the external turbine such that when the external turbine rotates the internal turbine rotates, the internal turbine comprising:
        a hub;
        a plurality of blades extending radially from the hub; and
        a shaft having one end connected to the hub of the internal turbine and another end connected to the hub of the external turbine; and
    a support member connected to at least one of the external turbine and the internal turbine and connectable to at least a portion of the exhaust pipe of the vehicle such that the external turbine is positioned on an exterior side of the exhaust pipe when the internal turbine is positioned in the exhaust pipe and such that when the vehicle is in forward motion, air flow over the external turbine causes the external turbine to rotate and thereby causes the internal turbine to rotate to cause exhaust of the vehicle to be extracted from the exhaust pipe.

2. The apparatus of claim 1 wherein the external turbine further includes an outer ring connected to the outer ends of each of the blades.

3. The apparatus of claim 1 further comprising a shield positioned over a portion of the external turbine, the external turbine being rotatable relative to the shield.

4. The apparatus of claim 1 wherein the support member has a carrier body with an axial bore, and wherein the shaft of the internal turbine extends through the axial bore of the carrier body so that the shaft may rotate relative to the support member.

5. The apparatus of claim 4 wherein the support member includes a plurality of brace members extending radially from the carrier body, the brace members being connectable to the exhaust pipe.

6. An apparatus for evacuating exhaust from an exhaust pipe of a vehicle, comprising:
    an external turbine;
    an internal turbine connected to the external turbine such that when the external turbine rotates the internal turbine rotates; and
    a support member connected to at least one of the external turbine and the internal turbine and connectable to at least a portion of the exhaust pipe of the vehicle such that the external turbine is positioned on an exterior side of the exhaust pipe when the internal turbine is positioned in the exhaust pipe and such that when the vehicle is in forward motion, air flow over the external turbine causes the external turbine to rotate and thereby causes the internal turbine to rotate to cause exhaust of the vehicle to be extracted from the exhaust pipe,
    wherein the support member has a first portion connected to the external turbine and a second portion connectable to the exterior side of the exhaust pipe, the first portion being rotatable relative to the second portion.

7. An apparatus for evacuating exhaust from an exhaust pipe of a vehicle, comprising:
    an external turbine;
    an internal turbine connected to the external turbine such that when the external turbine rotates the internal turbine rotates;
    a support member connected to at least one of the external turbine and the internal turbine and connectable to at least a portion of the exhaust pipe of the vehicle such that the external turbine is positioned on an exterior side of the exhaust pipe when the internal turbine is positioned in the exhaust pipe and such that when the vehicle is in forward motion, air flow over the external turbine causes the external turbine to rotate and thereby causes the internal turbine to rotate to cause exhaust of the vehicle to be extracted from the exhaust pipe; and
    a transmission assembly linking the external turbine to the internal turbine such that the internal turbine rotates at a rate different than the rate of rotation of the external turbine.

8. An exhaust evacuation apparatus in combination with an exhaust pipe of a vehicle, the exhaust evacuation apparatus comprising:
    an external turbine having a tubular base with a plurality of blades extending outwardly therefrom, the base being rotatable about the exhaust pipe, the external turbine further having a hub connected to the base so that the hub is in a coaxial relationship with the base;
    an internal turbine connected to the external turbine such that when the external turbine rotates the internal turbine rotates, the internal turbine comprising:
        a hub;
        a plurality of blades extending radially from the hub; and
        a shaft having one end connected to the hub of the internal turbine and another end connected to the hub of the external turbine; and
    a support member connected to at least one of the external turbine and the internal turbine and connected to at least a portion of the exhaust pipe of the vehicle such that the external turbine is positioned on an exterior side of the exhaust pipe and the internal turbine is positioned in the exhaust pipe so that when the vehicle is in forward motion, air flow over the external turbine causes the external turbine to rotate and thereby causes the internal turbine to rotate to cause exhaust of the vehicle to be extracted from the exhaust pipe.

9. The combination of claim 8 wherein the external turbine further includes an outer ring connected to the outer ends of each of the blades.

10. The combination of claim 8 wherein the support member has a carrier body with a central axial bore, and wherein the shaft of the internal turbine extends through the central axial bore of the carrier body so that the shaft may rotate relative to the support member.

11. The combination of claim 10 wherein the support member includes a plurality of brace members extending from the carrier body, the brace members being connected to the exhaust pipe.

12. An exhaust evacuation apparatus in combination with an exhaust pipe of a vehicle, the exhaust evacuation apparatus comprising:
   an external turbine;
   an internal turbine connected to the external turbine such that when the external turbine rotates the internal turbine rotates; and
   a support member connected to at least one of the external turbine and the internal turbine and connected to at least a portion of the exhaust pipe of the vehicle such that the external turbine is positioned on an exterior side of the exhaust pipe and the internal turbine is positioned in the exhaust pipe so that when the vehicle is in forward motion, air flow over the external turbine causes the external turbine to rotate and thereby causes the internal turbine to rotate to cause exhaust of the vehicle to be extracted from the exhaust pipe,
   wherein the support member has a first portion connected to the external turbine and a second portion connected to the exterior side of the exhaust pipe, the first portion being rotatable relative to the second portion.

13. An exhaust evacuation apparatus in combination with an exhaust pipe of a vehicle, the exhaust pipe being oriented vertically, the exhaust evacuation apparatus comprising:
   an external turbine;
   an internal turbine connected to the external turbine such that when the external turbine rotates the internal turbine rotates;
   a support member connected to at least one of the external turbine and the internal turbine and connected to at least a portion of the exhaust pipe of the vehicle such that the external turbine is positioned on an exterior side of the exhaust pipe and the internal turbine is positioned in the exhaust pipe so that when the vehicle is in forward motion, air flow over the external turbine causes the external turbine to rotate and thereby causes the internal turbine to rotate to cause exhaust of the vehicle to be extracted from the exhaust pipe; and
   a wind shield positioned over a portion of the external turbine to shield the blades of the external turbine rotating in the forward direction as the vehicle is in forward motion.

14. An exhaust evacuation apparatus in combination with an exhaust pipe of a vehicle, the exhaust evacuation apparatus comprising:
   an external turbine;
   an internal turbine connected to the external turbine such that when the external turbine rotates the internal turbine rotates;
   a support member connected to at least one of the external turbine and the internal turbine and connected to at least a portion of the exhaust pipe of the vehicle such that the external turbine is positioned on an exterior side of the exhaust pipe and the internal turbine is positioned in the exhaust pipe so that when the vehicle is in forward motion, air flow over the external turbine causes the external turbine to rotate and thereby causes the internal turbine to rotate to cause exhaust of the vehicle to be extracted from the exhaust pipe; and
   a transmission assembly linking the external turbine to the internal turbine such that the internal turbine rotates at a rate different than the rate of rotation of the external turbine.

\* \* \* \* \*